Sept. 26, 1944.     W. D. HARPER     2,359,036
SUPPORTING MEANS FOR VEHICLE BODIES AND OTHER STRUCTURES
Filed Aug. 3, 1943     2 Sheets—Sheet 1

Inventor
William D. Harper

Patented Sept. 26, 1944

2,359,036

UNITED STATES PATENT OFFICE 2,359,036

SUPPORTING MEANS FOR VEHICLE BODIES AND OTHER STRUCTURES

William D. Harper, Wellesley, Mass.

Application August 3, 1943, Serial No. 497,158

5 Claims. (Cl. 248—358)

The present invention relates to means for supporting bodies of vehicles, and other superstructures, on bases or nether structures with provision for limited yieldingly resisted lateral movement. It is of the same general nature as the body support and the combination of such support with nether and superstructures, disclosed in my prior Patent 1,695,373, dated December 18, 1928. The present invention embodies improvements over that of the said patent by which the strength and load carrying capacity of the device are increased and its cost of manufacture lessened, while all of the advantageous features of the prior construction are retained.

In the accompanying drawings.

Like reference characters designate the same parts wherever they occur in all the figures.

Figure 1:
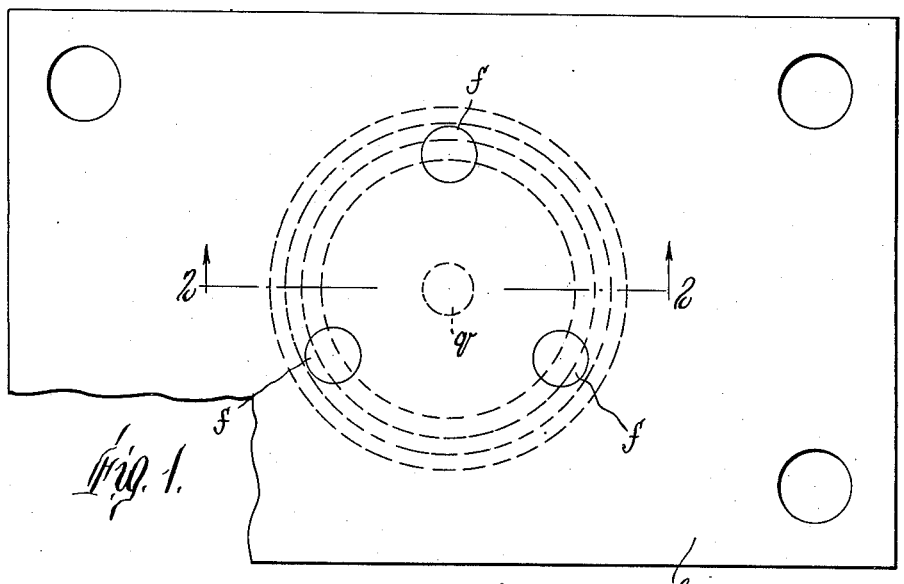
Fig. 1 is a plan view of typical unit combination in which the invention is embodied.

The embodiment of the invention shown in Figs. 1–4 consists of a lower bearing cup $a$, a rocker $b$ contained partially in a cavity in the top side of the cup $a$, and an inverted bearing cup $c$ having a cavity in its lower side in which the upper half of the rocker is contained. These cups are secured rigidly to plates $d$ and $e$ respectively. The cups and plates may be secured together in any desired way, one illustrative means being shown here and consisting of studs $f$ on the outer side of each cup which are received and anchored in holes in the plates. Welding, upsetting of the studs in the holes, or any other practical mode of union may be employed.

The plate $b$ is adapted to be secured to some part of the chassis of a vehicle, or other supporting structure or base, in such location that the recessed side of the cup faces upward, and the axis of the recess is vertical when the base is horizontal. Correspondingly the plate $e$ is adapted to be secured to the under side of a vehicle body or other construction or superstructure which may be capable of support by such means. In its operative relation it is located so that the bearing cup $c$ is inverted with its recessed side facing downward and the axis of the cavity vertical if the superstructure is horizontal. These plates in the present illustration typify any base or supporting structure and any supported body and they illustrate, in combination with the cups and rocker, all combinations embodying this invention.

Novel characteristics of this invention are that the rocker and cup cavities are all of generally elliptical curvature in vertical cross section, so related that the major axes of their curvatures are substantially horizontal and the minor axes substantially vertical when the parts are in equilibrium with the base structure horizontal. The following description will be given with reference to the normal position of equilibrium, which is shown in all the figures of the drawings, except Figs. 3, 4 and 8.

Preferably the curvatures of the rocker above and below the horizontal plane of their minor axis are identical and symmetrical. Preferably also the cavities in both bearing cups are of equal depth, equal width at the rim and like curvature, and their depth is less than half the length of the minor axis of curvature of the rocker. The major axis of curvature of the cavities is longer than the major axis of the rocker curvature. These conditions enable the rocker to be partially, and equally, contained in the cavities of both cups and cause the upper cup to rest on the rocker and not directly on the lower cup, and they enable the rocker to be tilted relatively to each cup in rolling contact with the surface of the cavity therein.

Variations from the preferred design here shown may be made within the scope of the invention. Thus the curvatures may depart from those of true ellipses; the curvatures of the rocker and cavities above and below the horizontal plane may be unlike; and the cavities of the two cups may be of unequal depth provided only their combined depth is enough less than the minor axis of the rocker curvature to prevent supporting and rubbing contact of the upper cup with the lower cup, provided the cup cavities are wider than the rocker and the curvatures of all these surfaces are continuous without abrupt changes. By virtue of their elliptical curvatures and their disposition substantially as shown and described, the curves are relatively flat in the uppermost and lowermost portions of the rocker and in the bottoms of the cavities, and they have progressively shorter radii in approaching the horizontal middle plane of the rocker and the rims of the cavities. Thus the parts of the assemblage are in stable equilibrium when in the position shown on Fig. 2 and they tend to return to this position under the force of gravity after having been deflected by lateral force.

Figure 2:
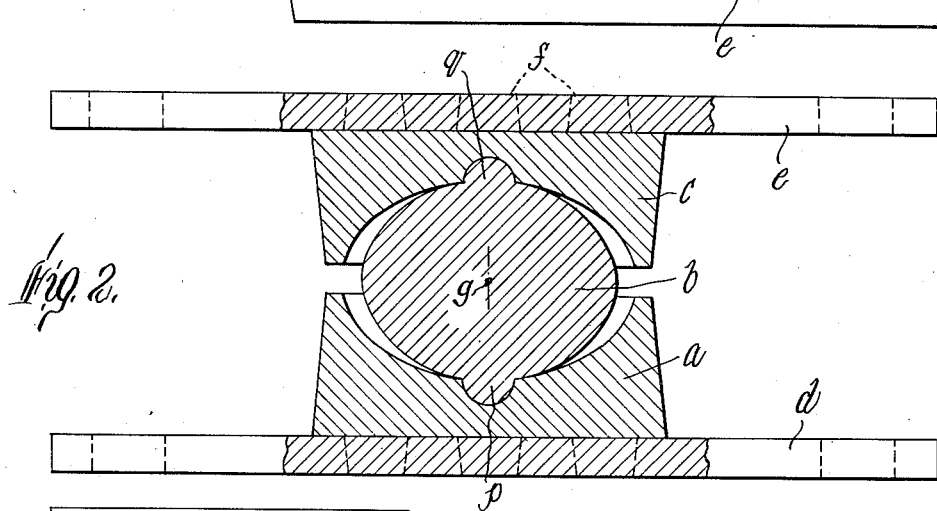
Fig. 2 is a vertical section on line 2—2 of Fig. 1.
Figures 3, 4:
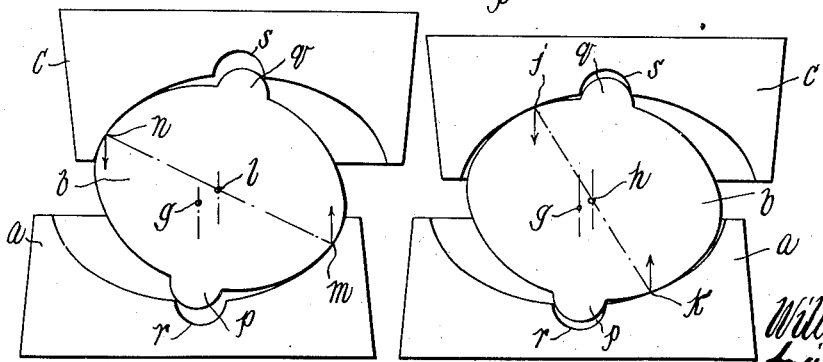
Figs. 3 and 4 are views of the supporting unit detached and shown respectively in two of the many different relations which they may assume in consequence of lateral forces acting on the supported and supporting structures with which the unit is combined.
Figure 5:
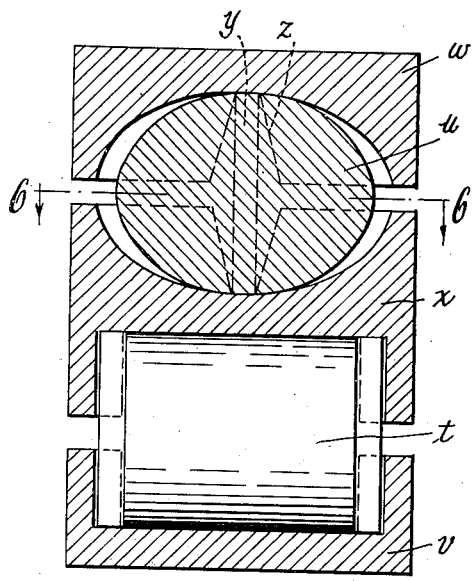
Fig. 5 is a vertical sectional view of a different embodiment of the invention containing the same essential principles.
Figure 6:
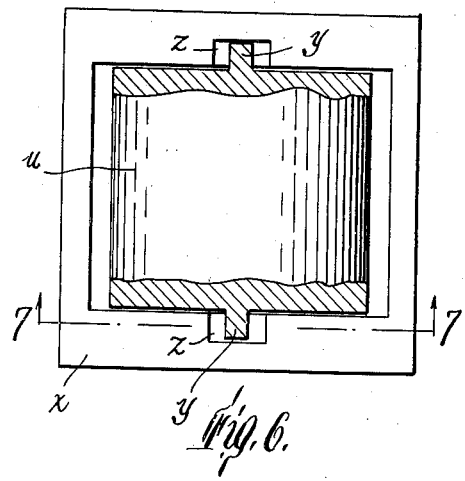
Fig. 6 is a sectional plan view of the parts below the line 6—6 of Fig. 5.

The rocker shown in Figs. 2, 3 and 4 is essentially an oblate spheroid, or of oblate spheroidal character, and the cavities in the bearing cups are polar segments of oblate spheroidal concave curves. Thus their sections are substantially alike in all planes which include the minor axis or axes of curvature.

When the superstructure is acted on by a horizontal component of force while the base remains stationary, it is displaced laterally. In being thus displaced it tilts the rocker and is raised thereby in greater or less measure, depending on the intensity of the force. Fig. 4 shows the relative displacement of the cups and rockers under a force of moderate intensity. The upper bearing cup then rolls on the rocker and the rocker rolls on the lower bearing cup, with shifting of its center laterally and upwardly from the point $g$ to the point $h$, and the shifting of the central points of tangency with the lower and upper cups to the points $k$ and $j$, respectively. The upper bearing cup and the load supported thereon are raised approximately twice as much as the rise of the rocker center. The forces due to the weight of the load and the reaction of the base form a couple tending to restore the parts to the position of equilibrium, as diagrammatically represented in Fig. 4. The moment arm of the couple is equal to the perpendicular distance from the displaced center $h$ to the vertical lines passing through the points $j$ and $k$.

The displacement due to a relatively much greater lateral force is shown in Fig. 3. The upper cup and the load are displaced and lifted still further, with shifting of the rocker center to the point $l$ and of its centers of tangency with the bearing cups to the points $m$ and $n$, respectively. The restoring couple in this case then acts with a much longer moment arm, as is made graphically apparent by comparison of Figs. 3 and 4. Thus displacement of the load is resisted with constantly increasing force, and the resistance is greater than proportional to the extent of displacement of the load. Very slight forces suffice to move the load from its position of equilibrium, when the flattest parts of the curved surfaces are in contact, and thereby vibrations and minor shocks are readily absorbed. Major shocks and forces are also absorbed and softened, and are opposed by disproportionately increasing restoring forces.

There is also a positive limit beyond which the superstructure cannot be displaced by horizontal forces. This limit is reached when the line connecting the tangent centers coincides with the major axis of the rocker curve and is perpendicular to the curve of the bearing cavity next to its rim. The approach of the line of centers to the major axis is apparent from a comparison of the lines $j$, $k$ and $m$, $n$.

Tapering bosses $p$ and $q$ are provided at the poles of the spheroidal rocker and complemental recesses $r$ and $s$ are provided in the bottoms of the cup cavities. They center the rocker and bearing cups, prevent relative slip between the cups and rocker when the flatter portions of the curved surfaces are in contact, and are tapered sufficiently to avoid binding and to permit free withdrawal of the bosses at the commencement of rocking motion. In the design shown they are substantially hemispherical, but that is not an essential limitation, as they may have other curvatures or even be conical.

By virtue of the spheroidal formation of the rocker and bearing cavities, these members act in the same way in all horizontal directions.

Three or more of the supporting units are employed simultaneously in any combination with a base and a superstructure or body, with the units at the angles of a triangle or quadrilateral, in parallel lines, or in any other arrangement which will support the superstructure stably. Thus, for instance, they may be applied in the manner shown in my prior Patents 1,695,373, 1,652,357, or otherwise as desired. Where more than three are employed they are suitably disposed to bear each a fractional part of the total load.

In the case of an automobile or other moving vehicle, relative movements between the members like those illustrated may occur when the vehicle is accelerated or retarded, and when it changes direction, and either cup may tilt relative to the rocker, with similar shifting of its tangent bearing under various conditions of spring flexure, slopes of the road, etc.

In use with a road vehicle, separation of the cups far enough to permit escape of the rocker by bouncing of the body due to bumps in the road is prevented by hold down means which set a positive limit to separating movement while permitting such rise of the body as is due to the rocker. Various limit stops may be used, including those shown in my prior patents and in my pending application Serial No. 373,523, filed January 8, 1941, now Patent No. 2,355,528, granted August 8, 1944, and others.

The principles of the invention are not limited to the spheroidal type of rocker and cups precedently described, but may be embodied also in units having rockers having convex cylindrical surfaces and bearings with concave cylindrical surfaces; all of said surfaces having elliptical characteristics substantially like those precedently described. In this description the terms "cylindrical surface" and "cylinder" are used in the sense of the following definition, "A curved surface generated by a moving straight line which continually touches a given curve, and in all of its positions is parallel to a given fixed straight line not in the plane of the curve. A solid bounded by a cylindrical surface and two parallel planes is called a cylinder."

Figure 8:
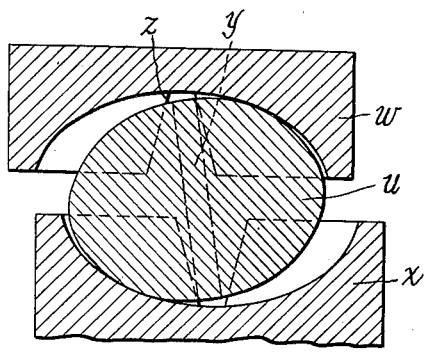
Fig. 8 is a view similar to Fig. 7 but showing the parts of the supporting unit displaced laterally relative to one another.
Figure 7:
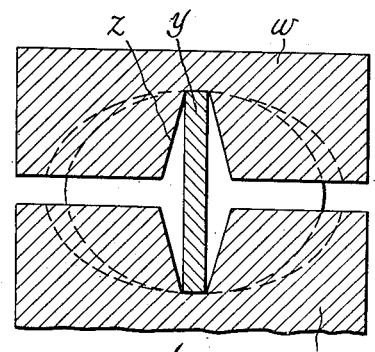
Fig. 7 is a sectional view taken on line 7—7 of Fig. 6.

Figs. 5-9 show two cylindrical rockers $t$ and $u$ of elliptical cross section in operative combination with a supporting bearing cup $v$ having a cavity in its upper side of concave cylindrical curvature receiving the lower portion of the rocker $t$, an upper bearing cup $w$ having a cavity in its under side of concave cylindrical curvature receiving the upper portion of the rocker $u$, and an intermediate member $x$ having a cavity in its under side receiving the upper part of the rocker $t$ and a cavity in its upper side receiving the lower portion of the rocker $u$. All of these cavities are of elliptical curvature having relationships to the rocker curves similar to those existing and precedently described in respect to the bearings $a$ and $c$ and the rocker $b$. The surface elements of the rockers $t$ and $u$ are at substantially right angles to each other and so are the surface elements of the bearing cavities in which one rocker is received at substantially right angles to the surface elements of the cavities receiving the other rocker. The rocking action of this embodiment is substantially the same as that shown in Figs. 3 and 4, as is illustrated by Fig. 8; with this difference, that each sub unit or couple of rocker and cavities can rock in one direction only. Stresses applied at different inclinations to the rocker elements cause both couples to be displaced simultaneously in their restrained paths in different degrees.

Means for preventing slip of the rockers and bearing members are shown in Figs. 5-8 as consisting of ribs $y$, $y$ on the ends of the rockers projecting outward in the longitudinal plane of the minor axis of elliptical curvature into tapered notches $z$, $z$ in the end walls of the bearing members. The bottoms of the notches are in extension of the bottoms of the cavities at the middle portion thereof, and are of equal width to the extremities of the ribs, the terminal surfaces of which are flush with the top and bottom surfaces, respectively, of the rockers; while the sides of the notches flare equally from the mid position of the ribs. Thus the notches and ribs centralize the rockers without impeding their free rocking movement and free relative lateral displacement of the bearing members within the prescribed limits of such displacement.

Figure 9:
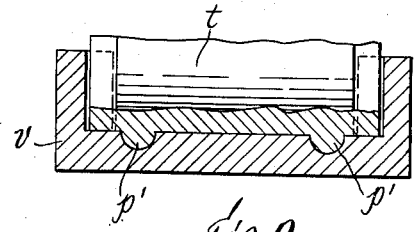
Fig. 9 is a fragmentary sectional view of a unit like that shown in Fig. 5 with the addition of centering bosses of the same nature as those with which the embodiment shown in Figs. 1–4 is provided.

Fig. 9 shows an application to the cylindrical rocker type of the centering means previously described in connection with the spheroidal type. This consists in bosses $p'$, $p'$ projecting from the top and bottom of each rocker into registering holes in the bearing cavities near the opposite ends of the rockers. Instead of two separate bosses, as here shown, a continuous rib may be provided extending longitudinally along each of the bottom and top sides of the rockers, with recesses to correspond in the bearing members.

What I claim and desire to secure by Letters Patent is:

1. A supporting device adapted to support a load with probisions for gravity resisted lateral displacement, comprising a lower bearing member having a spheroidal cavity in its upper side, a substantially non-deformable spheroidal rocker resting on the bottom of said cavity and protruding therefrom, and an upper bearing member having a spheroidal cavity in its under side resting on said rocker, both bearing members and the rocker having curved contact surfaces of progressively shortening radii of curvature from their middle areas toward their lateral extremities, and the cavities being wider than the rocker in sufficient measure to permit rocking movement of the latter with respect to both bearing members and lateral relative displacement with consequent rise of the upper bearing member from the position of equilibrium, the rocker having tapered bosses extending from the central portions of its top and bottom surfaces and the bearing members having depressions in the central areas of their cavities complemental to said bosses.

2. The combination with a base and a superstructure, of an intermediate supporter comprising a plurality of units each having opposed bearing cups and an interposed substantially non-deformable rocker resting in the cavity of one of said cups of each of said units and on which the other cup rests in inverted position; the cavities of said cups and the operating surface of the rockers being elliptical in vertical cross section, with their minor axes in a vertical plane in a position of equilibrium, and the major axis of the curvature of the rocker being shorter than the major axis of the curvature of the cup cavities, the minor axes of the rockers of all the units being parallel to one another, and the minor axes of all the corresponding cups of all the units being also parallel to one another in all conditions of equilibrium and disequilibrium of the parts of the combination.

3. The combination according to claim 2, wherein the cups and rockers of each unit have interengaging means to prevent relative lateral slip while in and near their position of equilibrium.

4. The combination according to claim 2, wherein there is included with each unit a lower bearing member having a cavity of cylindrical elliptical curvature, a substantially non-deformable rocker seated in said cavity having upper and lower surfaces of cylindrical elliptical curvature, and being of sufficient height to protrude from said cavity, an intermediate bearing member having cavities of elliptical cylindrical curvature in both top and bottom, of which the elements of the different curves are transverse to each other, said intermediate member resting on said last-mentioned rocker and containing the latter within its lower cavity and receiving the first-mentioned rocker in its upper cavity.

5. The combination according to claim 2, wherein there is included with each unit a lower bearing member having a cavity of cylindrical elliptical curvature, a substantially non-deformable rocker seated in said cavity having upper and lower surfaces of cylindrical elliptical curvature, and being of sufficient height to protrude from said cavity, an intermediate bearing member having cavities of elliptical cylindrical curvature in both top and bottom, of which the elements of the different curves are transverse to each other, said intermediate member resting on said last-mentioned rocker and containing the latter within its lower cavity and receiving the first-mentioned rocker in its upper cavity, and interengaging means between the bearing members and the rockers therein for preventing relative lateral slip while in and near their position of equilibrium.

WILLIAM D. HARPER.